April 20, 1926.

A. J. SCHULTZ, NOW BY JUDICIAL
CHANGE OF NAME A. L. SCHULTZ
BATTER PITCHER
Filed April 12, 1923

1,581,877

Inventor
Adolf L. Schultz,

By *(signature)*

Attorney

Patented Apr. 20, 1926.

1,581,877

UNITED STATES PATENT OFFICE.

ADOLF J. SCHULTZ, NOW BY JUDICIAL CHANGE OF NAME ADOLF L. SCHULTZ, OF KANSAS CITY, MISSOURI.

BATTER PITCHER.

Application filed April 12, 1923. Serial No. 631,649.

Be it known that ADOLF J. SCHULTZ, now by judicial change of name ADOLF L. SCHULTZ, a citizen of the United States of America, residing at Kansas City, in the county of Jackson and State of Missouri, has invented new and useful Improvements in Batter Pitchers, of which the following is a specification.

The object of the invention is to provide a simple and efficient means for containing and pouring batter for batter cakes wherein it is desirable to pour a plurality of cakes, sufficient for an order at one operation not only with a view to saving time of the operator but securing uniformity in size of the cakes and a simultaneous exposure thereof to the griddle; and with this object in view the invention consists in a construction and combination of parts of which a preferred embodiment is shown in the accompanying drawings, wherein—

Figure 1:
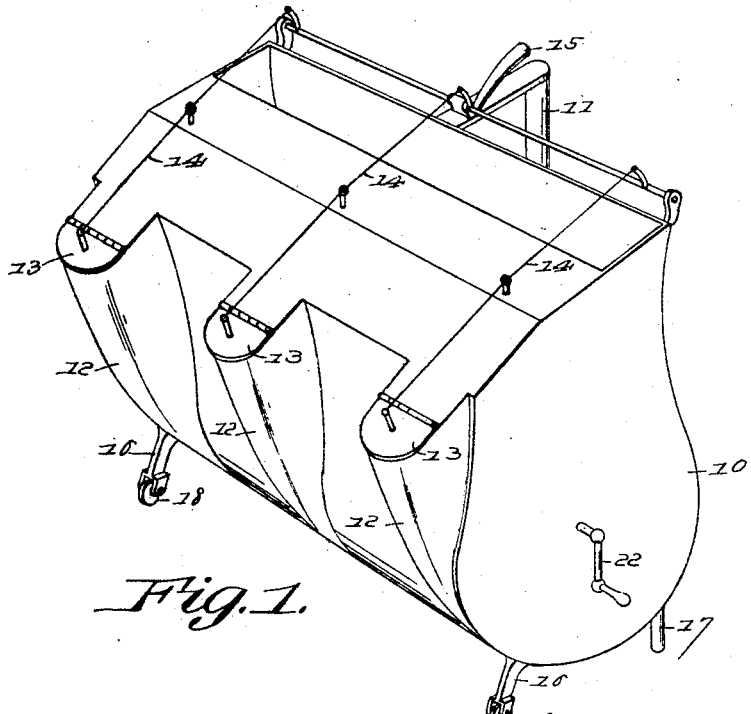
Figure 1 is a general view of a batter pitcher embodying the invention.
Figure 2:
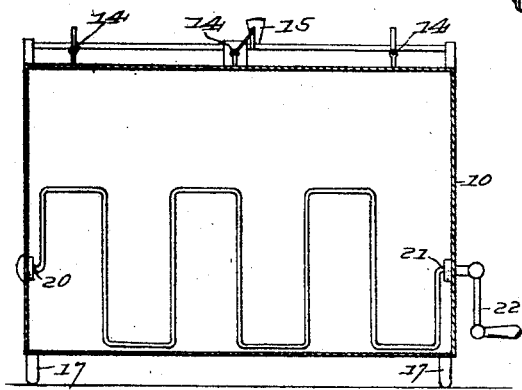
Figure 2 is a longitudinal.
Figure 3:
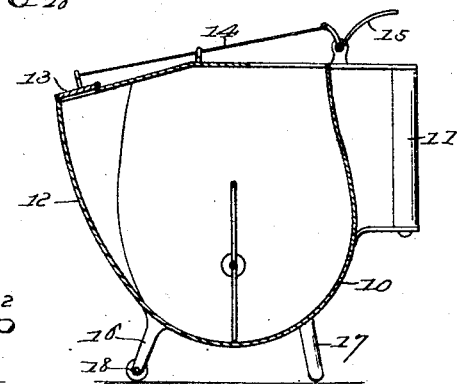
Figure 3 is a transverse sectional view of the same.

The body of the pitcher indicated at 10 may be of any suitable material with a handle 11 carried by the rear wall thereof and a plurality of outlet nozzles 12 in spaced side by side relation at the front wall, the outlet openings of the nozzles being fitted with caps or stoppers 13 connected by wires or rods 14 with a common operating lever 15 located within reach of the handle.

The receptacle is supported by front and rear legs 16 and 17 of which the former are preferably provided with rollers 18 to facilitate movement over the griddle and tilting of the receptacle to discharge the contents simultaneously through the outlet nozzles thereof.

In order that the settling or separation of the ingredients of the batter may be prevented, or any such tendency thereof counteracted, the receptacle is equipped with an agitator 19 consisting of a looped rod having terminal spindle portions 20 and 21 mounted in suitable bearings in the end walls of the receptacle, with the spindle 21 provided with a suitable exterior handle or crank 22 which may be turned from time to time to stir the contents of the receptacle and keep them at the proper consistency.

Having described the invention, what is claimed as new and useful is:—

A batter pitcher provided with a plurality of forwardly directed spaced outlet nozzles arranged in a common series for simultaneously discharging equal quantities of the fluid contents of the receptacle, a grip carried by the rear wall of said receptacle, and front and rear supporting legs of which the former only are provided with rollers to facilitate tilting and movement of the device over a griddle.

In testimony whereof he affixes his signature.

ADOLF J. SCHULTZ.